May 12, 1931.  H. M. JOHNSTON ET AL  1,805,096

FERTILIZER DISTRIBUTOR

Filed April 11, 1930

Inventor
H. M. Johnston
O. H. Shenstone
by J. Edw. Maybee
ATTY

Patented May 12, 1931

1,805,096

UNITED STATES PATENT OFFICE

HOWARD M. JOHNSTON AND OSBORNE H. SHENSTONE, OF TORONTO, ONTARIO, CANADA, ASSIGNORS TO MASSEY-HARRIS COMPANY, LIMITED, OF TORONTO, CANADA

FERTILIZER DISTRIBUTOR

Application filed April 11, 1930. Serial No. 443,384.

This invention relates to fertilizer distributors, and more particularly to the type used for distributing fertilizer over the whole area of a field, and comprising a receptacle provided with discharge slots and discharge members movable therein, and our object is to provide a distributor of this character which is simple in construction and operation, which will efficiently agitate the fertilizer in the receptacle, and which will distribute the fertilizer evenly over the ground.

We attain our objects by providing the distributor receptacle with transverse distributor members, the ends of which project through the slots or outlets formed in the opposite sides of the receptacle at the bottom thereof. These members, by means of suitable mechanism, are so moved that each member has an oscillatory movement about a point intermediate its ends, and also has a forward and backward movement as a whole. In other words, the imaginary center, about which each distributor member oscillates, is given a reciprocating movement longitudinally of the receptacle.

While various mechanisms might be employed to give the desired movements we show the ends of the distributor members pivotally connected to longitudinally arranged bars, which are reciprocated by means of cranks or eccentrics which are set so that their dead centers are non-coincident, the preferred position being with one crank at right angles to the other.

Figure 1:
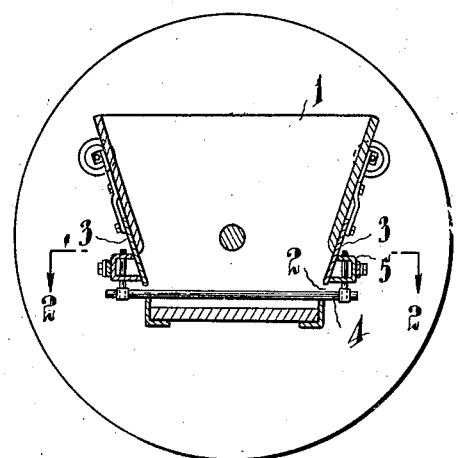
Figure 2:
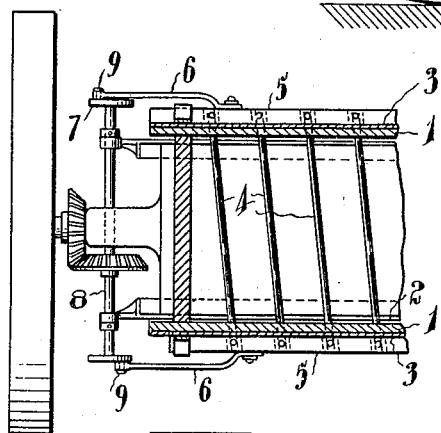
Figure 3:
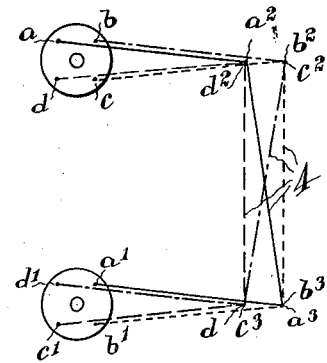
Figure 4:
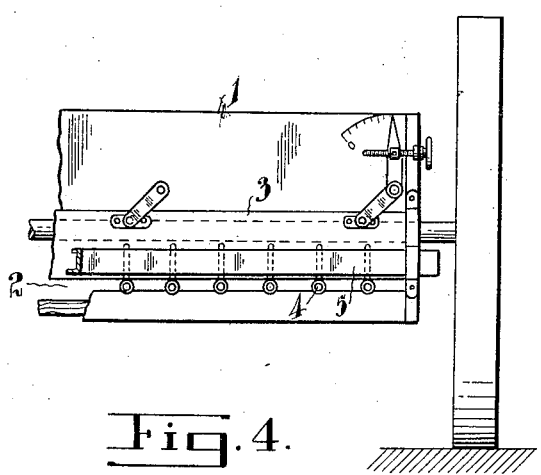

The constructions are hereinafter more fully described and are illustrated in the accompanying drawings in which Fig. 1 is a cross section of our machine;

Fig. 2 is a horizontal sectional detail of part of the machine;

Fig. 3 a diagrammatic view of some of the parts shown in Fig. 2 for illustrating the movements of an agitator member; and Fig. 4 a rear view of the machine.

In the drawings like numerals of reference indicate corresponding parts in the different figures.

1 is a receptacle or box having outlet openings or slot 2 formed in the sides thereof. Suitably controlled shutters or slides 3 are adapted to regulate the flow of fertilizer through the slots 2.

A plurality of agitating and distributing members 4 extend across the bottom of the receptacle and have their ends projecting through the slots 2. These ends are suitably connected with side rods 5 which are actuated, through the medium of connecting rods 6, by the cranks 7 on a suitably driven shaft 8. The crank pins 9, it will be seen, are set substantially at an angle of 90° to one another. From this construction it follows that every part of each distributor bar has a reciprocating movement lengthwise of the receptacle while each bar as a whole oscillates on its center which results in very efficient agitation and equable distribution. Of course, the rate of discharge may be varied by varying the length of stroke of the bars 5 and/or by adjusting the shutters 3 to vary the size of the slots 2.

What we claim as our invention is:

1. A machine for distributing fertilizer including a receptacle having fertilizer outlets at opposite sides; distributor members extending transversely for causing the fertilizer to be discharged through the outlets; and means connected with the opposite ends of each member for oscillating the members about their centers.

2. A machine for distributing fertilizer including a receptacle having fertilizer outlets at opposite sides; distributor members extending transversely for causing the fertilizer to be discharged through the outlets; and means connected with the opposite ends of each member for oscillating the members about their centers and for effecting at the same time a reciprocating movement of said centers longitudinally of the receptacle.

3. A machine for distributing fertilizer including a receptacle having discharge slots in opposite sides thereof; distributor members extending across the receptacle and having their ends projecting through the slots; and means connected with the opposite ends of the members exteriorly of the receptacle for reciprocating the said ends simultaneously, the said means including provisions for simultaneously oscillating the members about their centers and moving them back and forth as a whole.

4. A machine for distributing fertilizer including a receptacle having discharge openings at its sides; distributor members extending across the receptacle and having their ends projecting through the discharge opening; side rods pivotally connected to the ends of said members; connecting rods pivotally connected with the ends of the side rods; and a crank shaft provided with cranks actuating the connecting rods.

5. A machine for distributing fertilizer including a receptacle having discharge openings at its sides; distributor members extending across the receptacle and having their ends projecting through the discharge opening; side rods pivotally connected to the ends of said members; connecting rods pivotally connected with the ends of the side rods; and a crank shaft provided with cranks actuating the connecting rods set so that their dead centers are noncoincident.

Dated at Toronto, Canada, this 28th day of March 1930.

HOWARD M. JOHNSTON.
OSBORNE H. SHENSTONE.